US012766521B2

(12) United States Patent
Wyatt

(10) Patent No.: US 12,766,521 B2
(45) Date of Patent: Oct. 20, 2026

(54) TRANSPORTABLE BULK MATERIAL PROCESSING PLANT

(71) Applicant: Destec Crushers Pty Ltd, Canning Vale (AU)

(72) Inventor: Stephen Wyatt, South Perth (AU)

(73) Assignee: Destec Crushers Pty Ltd, Canning Vale (AU)

( * ) Notice: Subject to any disclaimer, the term of this patent is extended or adjusted under 35 U.S.C. 154(b) by 272 days.

(21) Appl. No.: 18/573,557

(22) PCT Filed: Jun. 22, 2022

(86) PCT No.: PCT/AU2022/050630
§ 371 (c)(1),
(2) Date: Dec. 22, 2023

(87) PCT Pub. No.: WO2022/266708
PCT Pub. Date: Dec. 29, 2022

(65) Prior Publication Data

US 2024/0424501 A1 Dec. 26, 2024

(30) Foreign Application Priority Data

Jun. 23, 2021 (AU) ................................ 2021204266

(51) Int. Cl.
*B02C 21/02* (2006.01)
*B02C 23/02* (2006.01)
(Continued)

(52) U.S. Cl.
CPC .............. *B02C 21/02* (2013.01); *B02C 23/02* (2013.01); *B02C 23/10* (2013.01); *B02C 23/16* (2013.01);
(Continued)

(58) Field of Classification Search
CPC .............................. B02C 21/02; B02C 21/026
See application file for complete search history.

(56) References Cited

U.S. PATENT DOCUMENTS 5,655,719 A 8/1997 Getz
6,935,587 B2 * 8/2005 Brock ..................... B02C 23/02 241/101.76
(Continued)

FOREIGN PATENT DOCUMENTS

AU 2016204336 A1 1/2017
CN 101328704 A 12/2008
(Continued)

OTHER PUBLICATIONS

European Patent Office Extended Search for Application No. 22826883.5 dated Aug. 8, 2024 (8 pages).
(Continued)

*Primary Examiner* — Matthew Katcoff
(74) *Attorney, Agent, or Firm* — Michael Best & Friedrich LLP

(57) ABSTRACT

A transportable bulk material processing plant (10) provides at least one of a crusher module (12) or a screening module (14). At least one of the modules has a transportable platform (16.1) supporting at least one respective crusher (18) screening machine (20). Supports (22), such as legs, support the respective platform (16.1) on the ground or on a base (24). The supports (22) can be unfastened from the structure of the platform (16.1) and the platform and supports can be transported, such as by sea, road or rail, for erection at a work site. A removable conveyor module (38) can be provided/inserted under the platform for receiving crushed/comminuted material. Crushed material from one of the crusher machines can be supplied via the conveyor (36) to a screening module (14). Retaining walls (40) can retain earth and can be pivotably attached to the structure of the
(Continued)

crusher module. The respective module (crushing or screening module) can include an on-board power system and/or an on-board control system, such as at an on-board MCC (66) to control electric motors for the module.

12 Claims, 7 Drawing Sheets

(51) Int. Cl.
*B02C 23/10* (2006.01)
*B02C 23/16* (2006.01)
*B07B 1/00* (2006.01)

(52) U.S. Cl.
CPC ........ *B07B 1/005* (2013.01); *B02C 2023/165* (2013.01)

(56) References Cited

U.S. PATENT DOCUMENTS

| | | | | |
|---|---|---|---|---|
| 11,376,631 | B2 * | 7/2022 | Kykyri | B07B 1/005 |
| 12,311,380 | B2 * | 5/2025 | Voigt | B02C 21/02 |
| 12,343,731 | B2 * | 7/2025 | McDevitt | B02C 23/12 |
| 2005/0263626 | A1 | 12/2005 | Brock et al. | |
| 2010/0193618 | A1 | 8/2010 | Lewis-Gray | |
| 2016/0107166 | A1 * | 4/2016 | Tschantz | B02C 21/026 241/24.31 |
| 2018/0065153 | A1 | 3/2018 | Andersen | |
| 2018/0154368 | A1 | 6/2018 | Sauser et al. | |
| 2024/0198385 | A1 * | 6/2024 | Sharma | B02C 23/08 |

FOREIGN PATENT DOCUMENTS

| | | | |
|---|---|---|---|
| CN | 102215665 | A | 10/2011 |
| CN | 205435973 | U | 8/2016 |
| CN | 110665622 | A | 1/2020 |
| EP | 1136130 | B1 | 4/2008 |
| JP | H05154403 | A | 6/1993 |
| WO | 1992000147 | A1 | 1/1992 |
| WO | 2009039559 | A1 | 4/2009 |
| WO | 2020021467 | A1 | 1/2020 |

OTHER PUBLICATIONS

International Search Report and Written Opinion for Application No. PCT?AU2022/050630 dated Nov. 29, 2022 (17 pages).

Chinese Patent Office Action for Application No. 202280044299.3 dated Jul. 28, 2026 (21 pages including English machine translation).

* cited by examiner

Section A-A

Section B-B

Section C-C

TRANSPORTABLE BULK MATERIAL PROCESSING PLANT

FIELD OF THE INVENTION

The present invention relates to a transportable bulk material processing plant.

One or more particular applications of the present invention relates to a transportable mineral processing plant.

Bulk materials are understood to include ores (such as iron ore and other minerals), coal and rock.

BACKGROUND TO THE INVENTION

Bulk materials to be processed can involve conveying mined/extracted ores and minerals to a fixed purpose-built processing site having individual crusher machines and screening machines.

Crusher machines comminute reduce larger bulk materials to smaller bulk material sizes. The resulting different sized materials are classified by size using screening machines. Larger pieces can be returned for further comminution, such as in a secondary or tertiary crusher machine, to make smaller pieces.

Electrical and hydraulic power and control supplies to the crusher machines and screening machines are typically in a purpose-built container or building, with cables and pipes externally connecting to the respective machines. Such electrical and hydraulic supplies are often exposed to harsh working and environmental conditions, particularly in mining areas such as in northern Australia, and are at risk of degradation and damage, or at least premature fault or failure compared to more protected sites/installations.

The logistics of bringing individual crusher machines and screening machines to site, installing each machine, connecting power and control supplies, and commissioning the machines and the power and control supplies is considerable. The time, number of personnel and site works is considerable, and delays occur, all of which involves considerable cost.

There can be significant downtime to repair conveyors that convey the materials between crusher machines, such as from primary crusher machines to secondary to tertiary crusher machines and/or between crusher machines and screening machines or vice-versa.

It is desirable to provide a bulk material processing plant that alleviates or at least provides an alternative to the aforementioned installations.

It is against this background and the problems and difficulties associated therewith that the present invention has been developed.

SUMMARY OF THE INVENTION

An aspect of the present invention provides a transportable bulk material processing plant including at least one transportable platform supporting at least one crusher machine or at least one screening machine.

The transportable bulk material processing plant may include at least one transportable module including the at least one crusher machine and/or the at least one screening machine. The transportable bulk material processing plant may include the at least one crusher machine and the at least one screening machine The respective platform may be attachable to a plurality of detachable ground supports. Thus, the transportable bulk material processing plant may include the at least one transportable platform and a plurality of grounds supports for attachment, directly or indirectly, to the respective platform to support the respective platform above ground level under the supports.

The respective platform of the transportable bulk material processing plant can be transported to site and erected onto the plurality of ground supports at the site.

The plurality of ground supports can include a number of legs, which may be attached to the platform by at least one fastener system, such as a bolt and nut arrangement.

The crusher module of the transportable bulk material processing plant may include multiple crusher machines. One or more of the crusher machines may include a jaw crusher, a cone crusher or a gyratory crusher.

Preferably the at least one crusher machine includes at least one primary crusher machine and, where secondary crushing is required, at least one secondary crusher machine. At least one tertiary crusher machine may be provided. The platform supporting the at least one crusher machine may support one or more of the primary, secondary and/or tertiary crusher machines, as required.

At least a portion of a conveyor arrangement may be provided below the crusher machine(s), such as below the platform. The conveyor arrangement may include at least one conveyor arranged and configured to receive crushed material (such as crushed iron ore) from at least one said crusher machine.

The conveyor arrangement may be arranged to convey crushed material to the at least one screening machines, such as at a screening module (e.g. of a screening plant).

The platform or platforms for supporting the at least one crusher machine or module and/or the at least one screening machine or module can be transported on a sea, road or rail vehicle.

A screening machine induces vibration to the material to be classified that causes particle separation through one or more screens. Larger materials are grade/size separated from smaller materials. The larger and/or smaller separated material may be returned to the crusher machine(s)/module(s) for further comminution.

The crusher module may include a number of material processing machines. The crusher module may include at least one scalping grizzly feeder prior to the primary crusher machine, such as for scalping/removing larger materials (e.g. larger rocks) to go into the primary crusher machine, and smaller materials may by-pass the primary crusher and be conveyed, preferably via the screening module, into a said secondary crusher machine and/or tertiary crusher machine as provided. The scalping grizzly feeder of the crusher module can be mounted on the platform of the crusher module above the primary crusher machine.

A by-pass conveyor arrangement can be provided, which may be part of the conveyer arrangement, such as provided at least partly below the platform.

The screening module may include a platform supported on one or more supports. The one or more supports may include removable legs. The removable legs may be attached to the platform of the screening module by bolting.

A said screening module may include at least one screening machine, or two or more screening machines which may operate in parallel to each other, such as to equally classify the materials for higher throughput. Two or more screening modules, with at least one or more screening machines in each, may be installed immediately adjacent to each other to classify materials at higher outputs.

Alternatively, the screening machines may be operated in series such that the first screening machine classifies materials above a prescribed larger size dictated by the aperture of the screen used, and the second screening machines receives the screened material of smaller size to further classify to separate mid-sized and smaller materials.

The larger sized screened materials may be returned a crusher module for further comminution. The mid-sized screened material may be returned a crusher module for further classification or be transported away as product. Preferably the smallest screened materials are transported away as product or for other processing.

It will be appreciated that parallel and series classification can be conducted by use of sufficient screening machines, such as four screening machines within two screening modules, two parallel arrangements of two screening machines in series.

More crusher modules and more screening modules can be added to the overall processing plant to increase capacity/throughput as desired.

The transportable and readily erected arrangement of modules (crusher and/or screening modules) enables a bulk materials/minerals processing plant to be brought to site, erected, enabled and running in a much shorter time with fewer personnel required than traditional build on-site installations.

The crusher modules and screening modules can be completely assembled and tested in a factory location prior to mobilisation to a remote site. In Western Australia at least, the size of the said modules enables transportation on road ways without the requirement for Police escort or removal of overhead powerlines.

The crusher module and/or the screening module may include on-board control systems and/or power systems. For example, power to motors for driving the crusher machines and the screening machines may be provided by an on-board power supply system. Likewise, one or more controllers may be provided to control the crusher machine(s) and the screening machine(s), lighting, data supply and feedback, data networks, remote monitoring and/or control etc.

It will be appreciated that each module may be configured as a turn-key/plug-and-play solution, wherein once the respective module is erected and power is supplied, the respective module is ready to operate/commission for use.

The transportable bulk material processing plant can include at least one scalping grizzly feeder for scalping material prior to supply to the crusher machine(s).

The at least one screening module can include the platform supported on one or more of the supports.

At least two said screening machines may be configured to operate in parallel to each other, such as to equally screen the materials for higher throughput or configured in series with one another to consecutively classify the material to different grades.

The processing plant may include at least one on-board control system and/or at least one on-board power system.

The at least one on-board control system and/or at least one on-board power system may be supported on the platform.

At least one screening module preferably includes at least two screening machines.

At least one screening module preferably includes at least two conveyors for transporting material from a surge or feed bin to the screening machines. Preferably, the screening machines separate the material into larger, medium and smaller component materials.

Preferably, a lower conveyor conveys screened material to a discharge outlet.

One or more conveyors may be provided to convey larger (oversize) and medium (middling) screened materials to respective discharge outlets.

In some embodiments, there is provided a transportable bulk material processing plant. The transportable bulk material processing plant may comprise a transportable crusher module. The transportable crusher module may comprise: a first container that is configured to receive a material; a crusher system that is configured to crush the material to produce crushed material; a first transportable platform that is configured to support the first container and the crusher system; and a plurality of supports. Each support may be configured to: removably connect to the first transportable platform after the first transportable platform is transported to first operating location; and support the first transportable platform on a first base at the first operating location. The transportable bulk material processing plant may comprise a transportable screening module. The transportable screening module may comprise a second container that is configured to receive the crushed material from the crusher system of the transportable crusher module. The transportable screening module may comprise a first screening conveyor, at least part of the first screening conveyor being disposed below an outlet portion of the second container, the first screening conveyor being configured to convey crushed material received from the outlet portion of the second container in a first direction. The transportable screening module may comprise a second screening conveyor, at least part of the second screening conveyor being disposed below the outlet portion of the second container, the second screening conveyor being configured to convey crushed material received from the outlet portion of the second container in a second direction, the second direction being different to the first direction. The transportable screening module may comprise a first classifier that is configured to receive the crushed material from the first screening conveyor and to separate the crushed material into a first plurality of groups. The transportable screening module may comprise a second classifier that is configured to receive the crushed material from the second screening conveyor and to separate the crushed material into a second plurality of groups.

BRIEF DESCRIPTION OF THE DRAWINGS

One or more embodiments of the present invention will hereinafter be described with reference to the accompanying Figures, in which:

FIGS. 10-14 show various views of a transportable processing plant incorporating a screening module according to an embodiment of the present invention.

In particular, FIG. 10 shows a perspective view, FIG. 11 shows a top (plan) view, FIG. 12 shows a side view, FIG. 14 shows a side sectional view.

DESCRIPTION OF PREFERRED EMBODIMENT(S)

Figure 1:
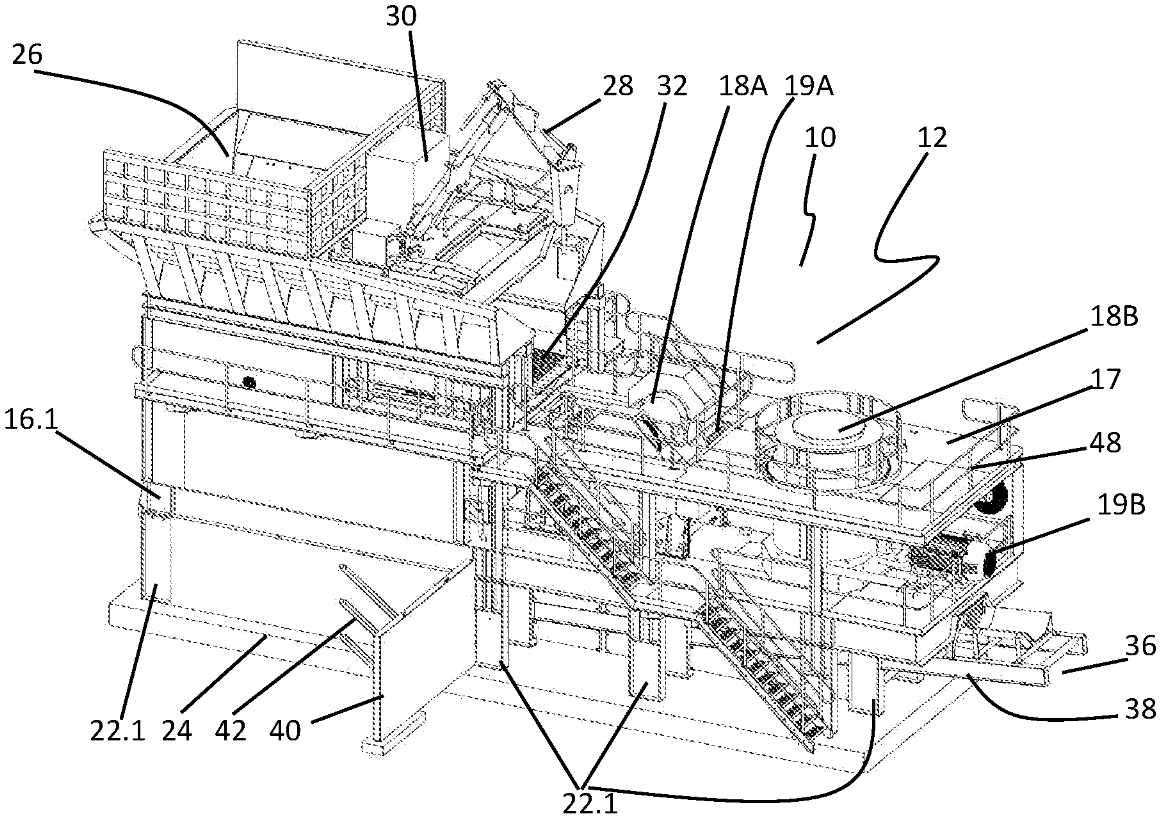
FIG. 1 shows a perspective view of a transportable processing plant according to an embodiment of the present invention.
Figure 2:
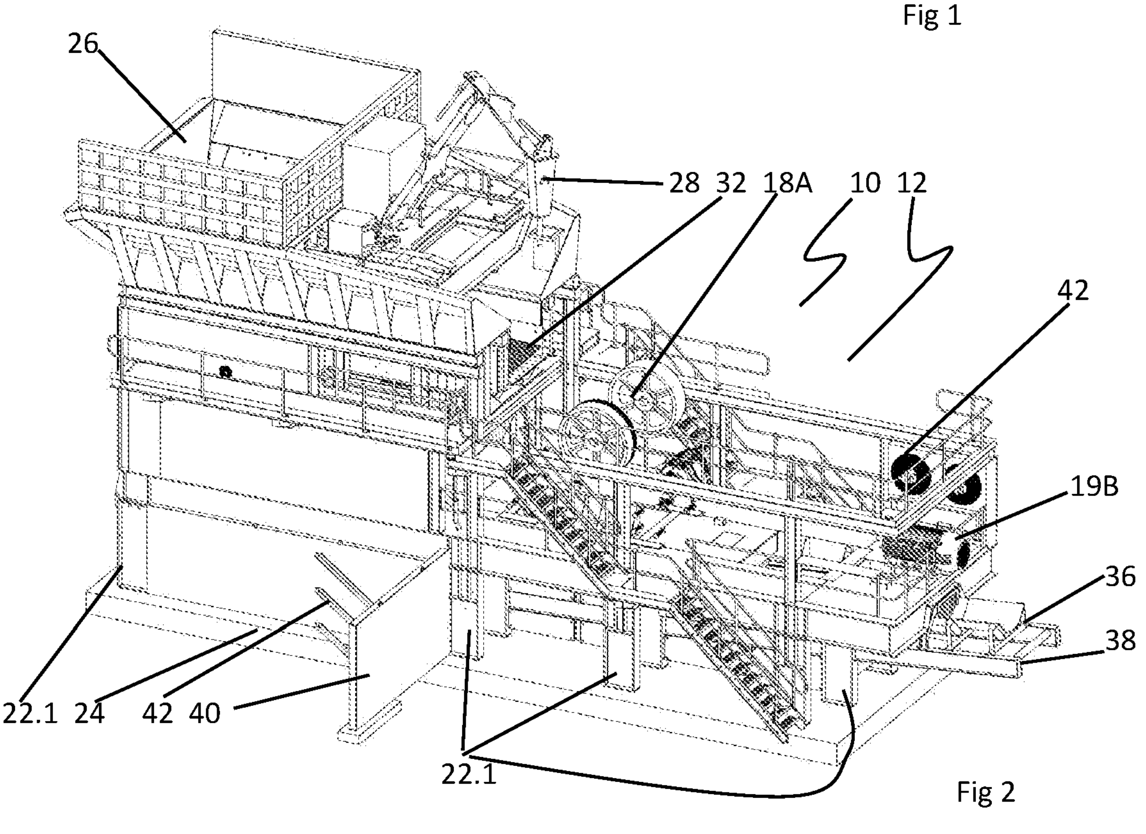
FIG. 2 shows the perspective view of FIG. 1 with partial removal of crusher machine components to show detail beneath.
Figure 3:
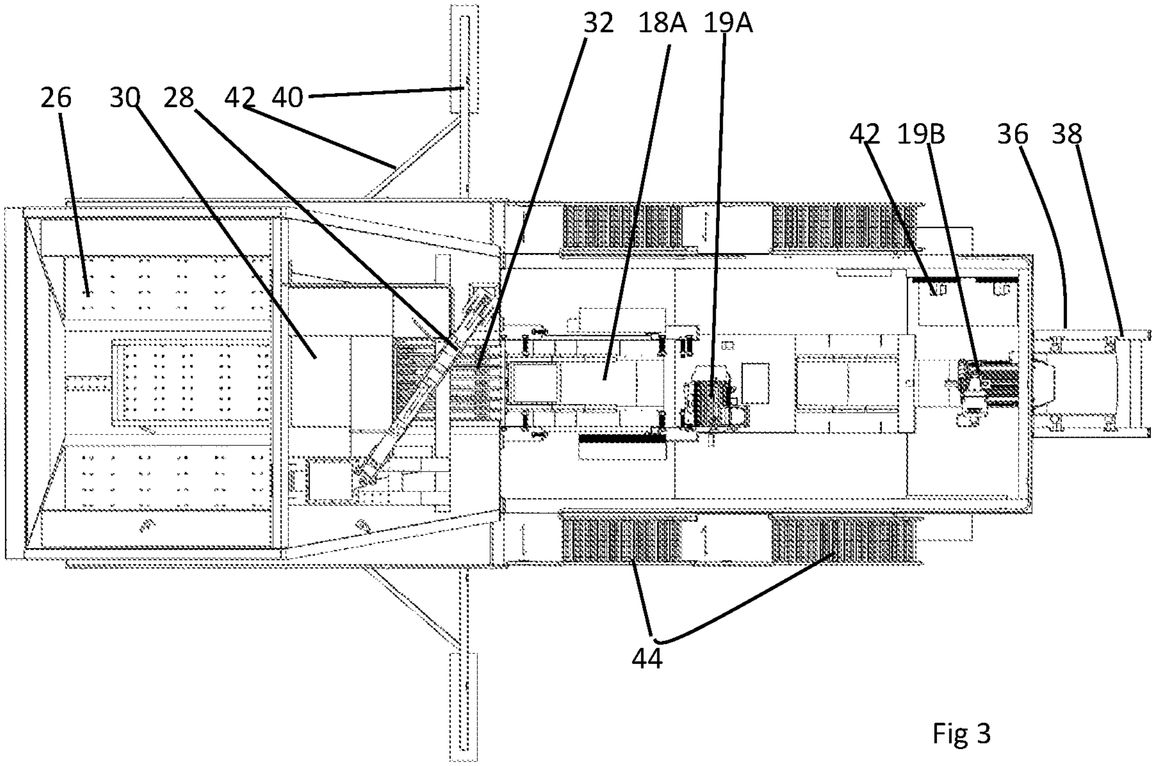
FIG. 3 shows a plan view of the embodiment shown in FIG. 1.
Figure 4:
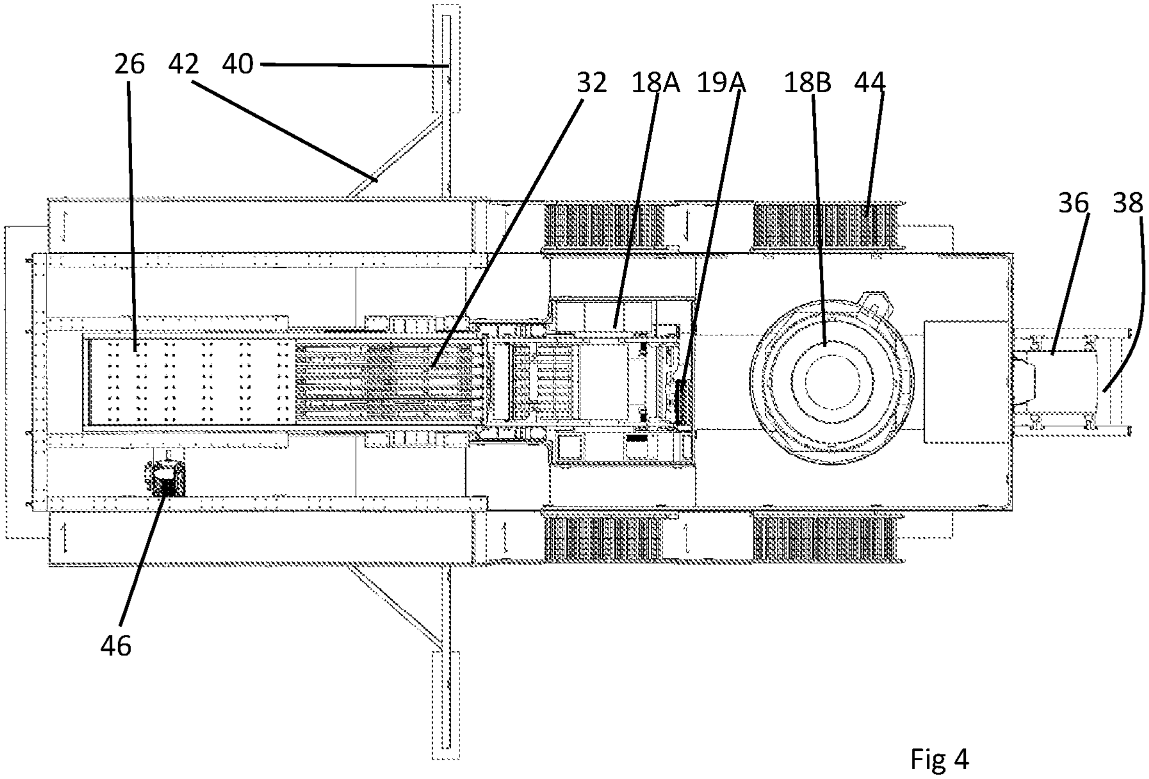
FIG. 4 shows a plan view of the embodiment shown in FIG. 2.
Figure 5:
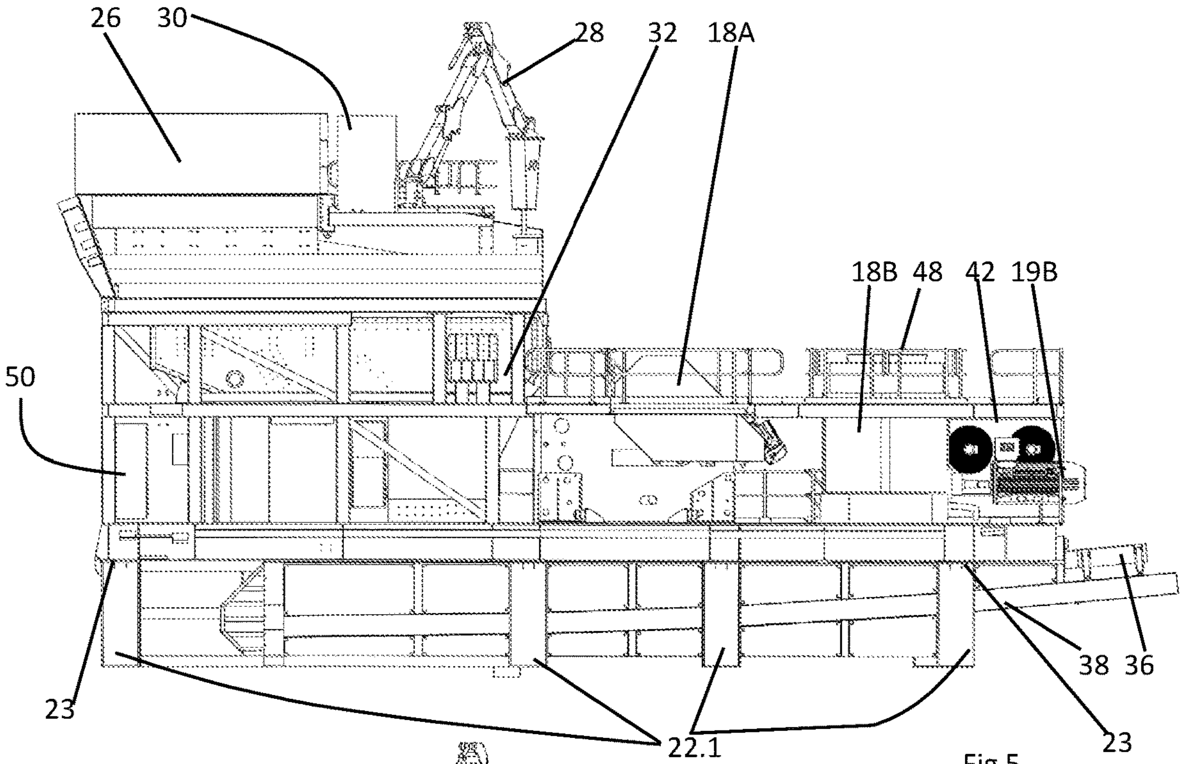
FIG. 5 shows a side view of a transportable processing plant according to FIG. 1.
Figure 6:
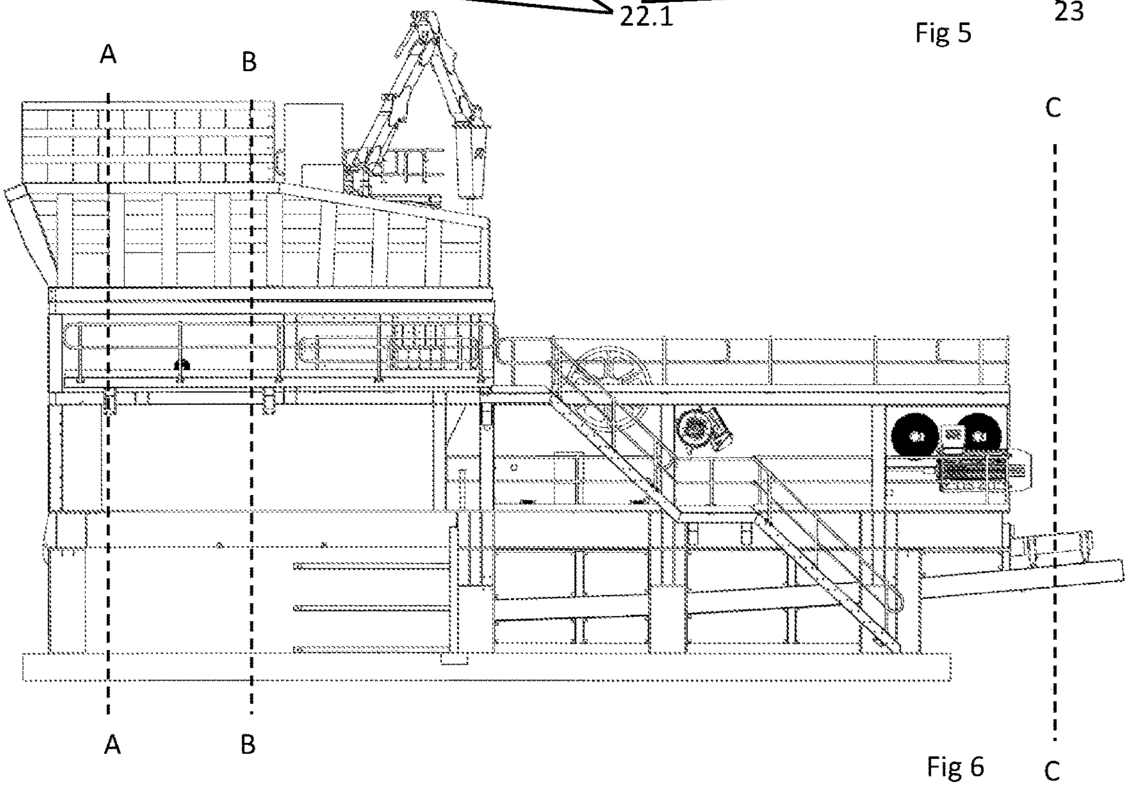
FIG. 6 shows a side view of a transportable processing plant according to FIG. 2.
Figure 7:
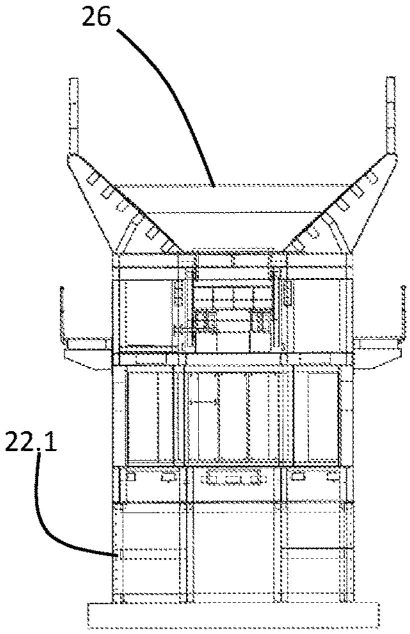
FIG. 7 shows a cross section along axis A-A in FIG. 6.
Figure 8:
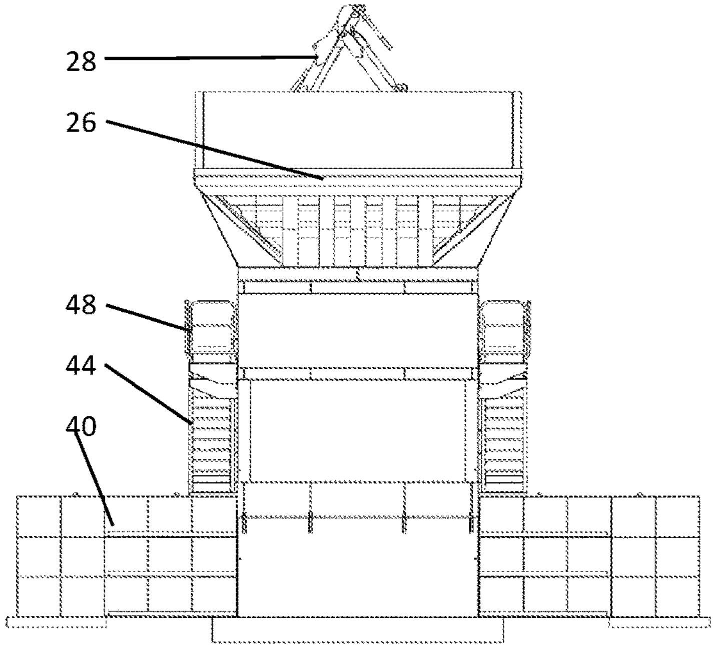
FIG. 8 shows a cross section along axis B-B in FIG. 6.
Figure 9:
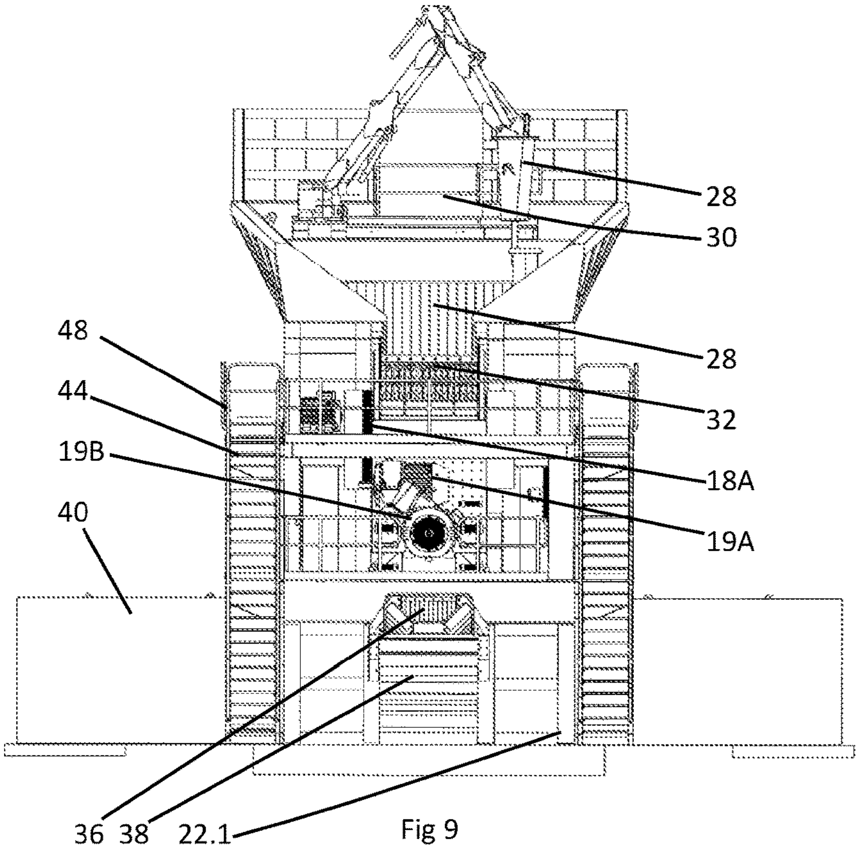
FIG. 9 shows a cross section along axis C-C in FIG. 6.
Figure 10:
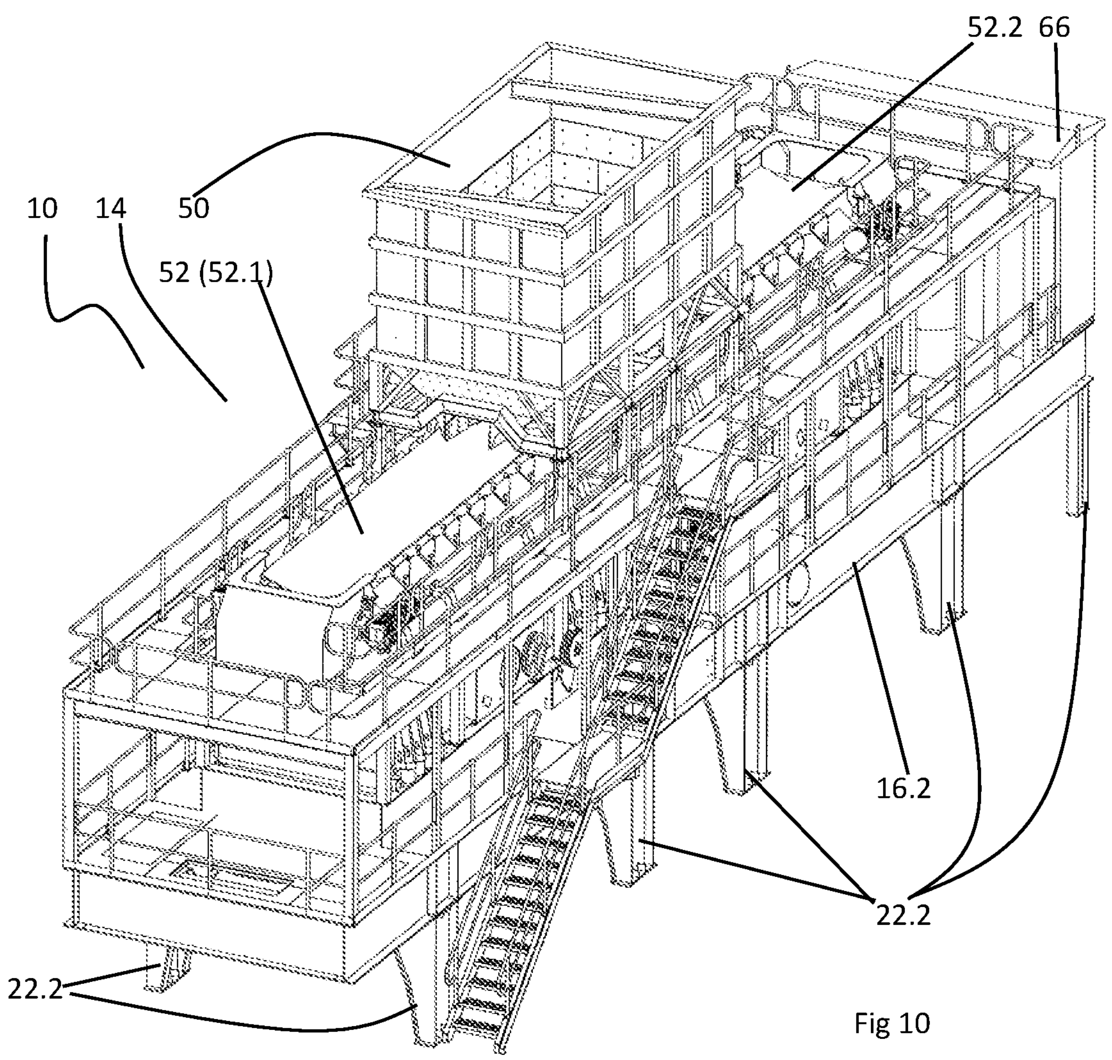
Figure 11:
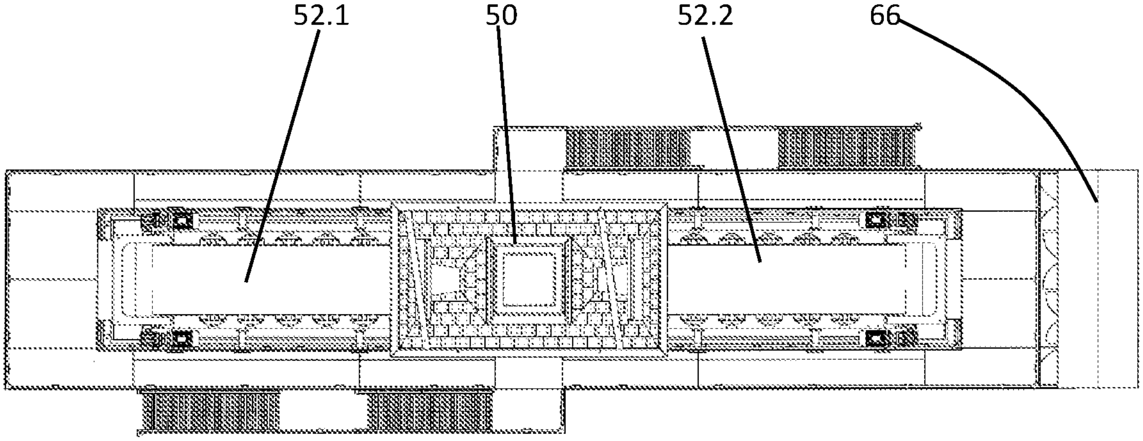
Figure 12:
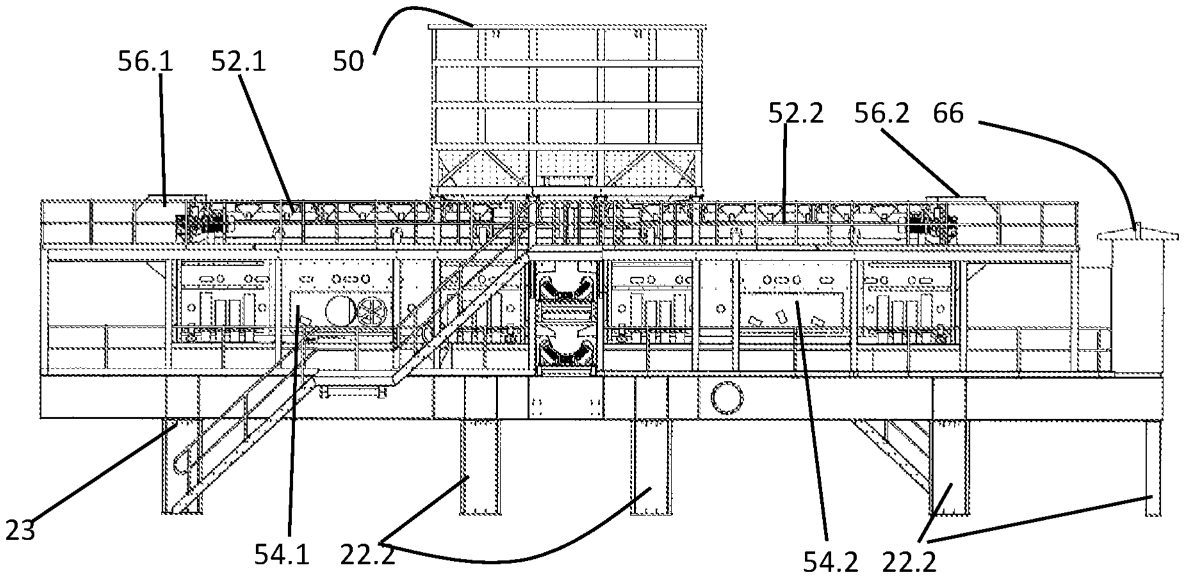
Figure 13A:
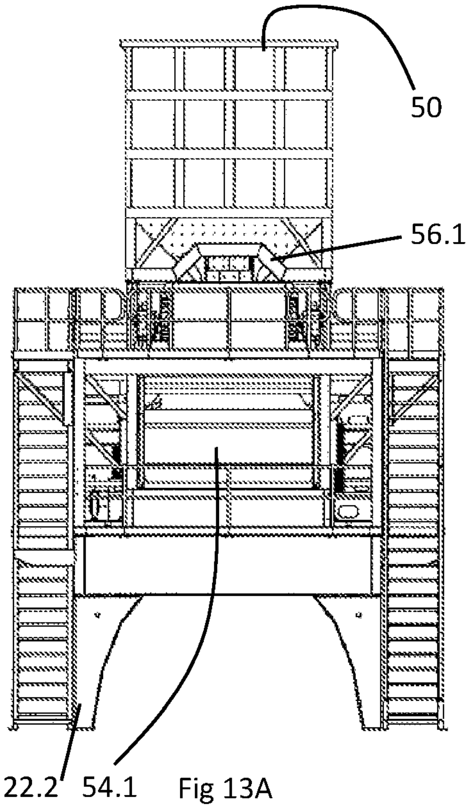
FIGS. 13A and 13B show respective end views.
Figure 13B:
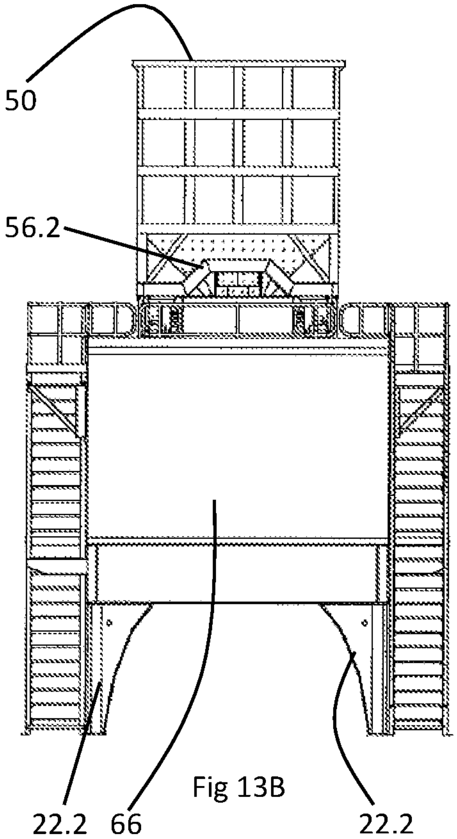
Figure 14:
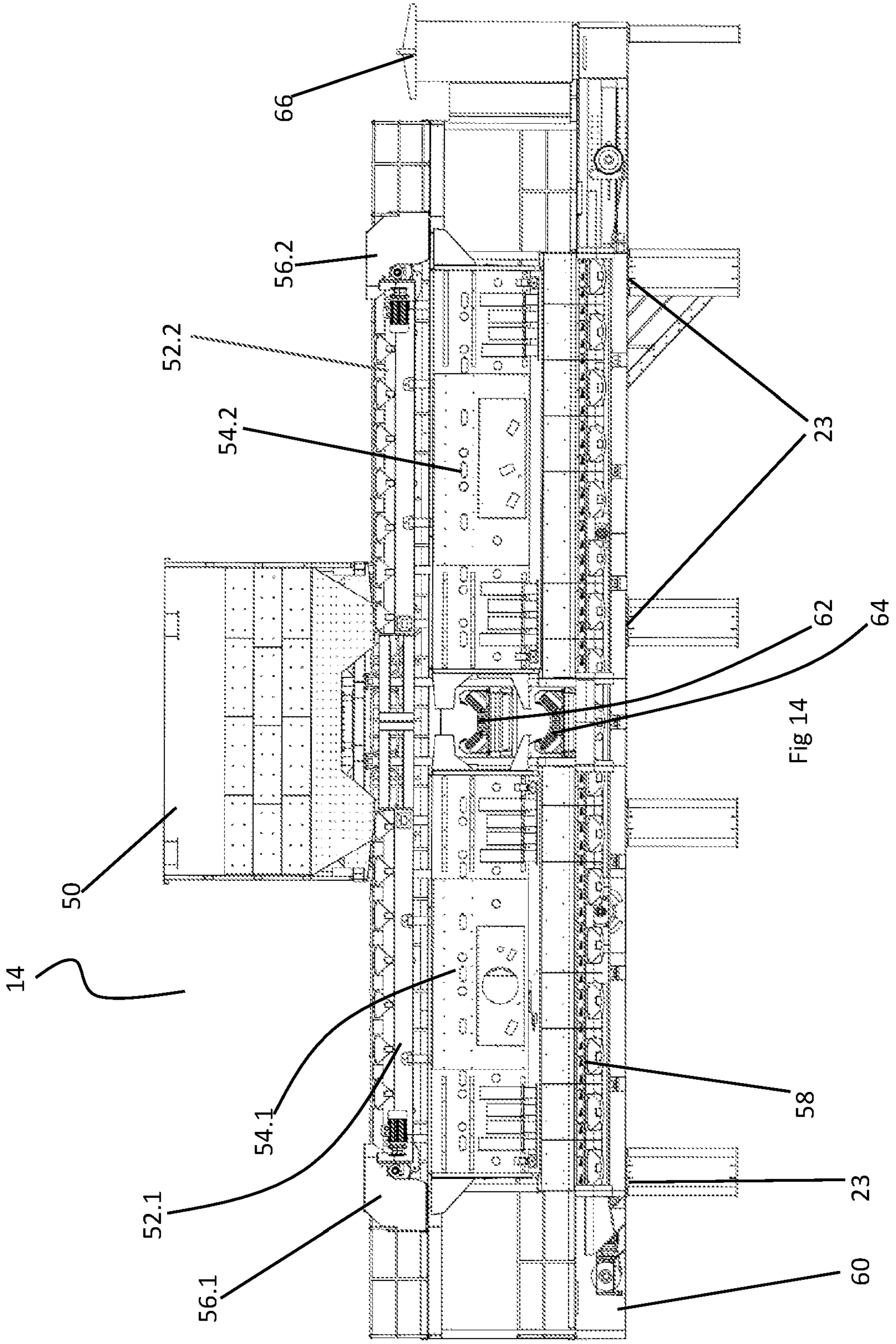

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

A transportable bulk material processing plant 10 provides at least one of a crusher module 12 or a screening module 14.

At least one of the modules includes a transportable platform, such as a platform 16.1 supporting at least one respective crusher 18A, 18B (such as a primary crusher 18A and/or secondary crusher 18B, and optional tertiary etc., crusher 18C . . . 18*n*) or screening machine.

The respective module includes supports 22.1, 22.2, such as legs, to support the respective platform 16.1 on the ground or on a base 24, such as a concrete base.

The supports 22.1, 22.2 are removable from the platform 16.1. For example, the supports 22.1, 22.2 can be attached to the platform 16.1 by fasteners 23 (e.g. bolts) and can be unfastened from the structure of the platform 16.1. The platform and supports can be transported, such as by sea, road or rail, for erection at a work site.

The crusher module 12 includes a 'Run of Mill' (ROM) bin 26 for receiving material to be processed, such as iron ore.

A rock breaker 28 and associated hydraulic supply 30 can be provided. The rock breaker comprises a hydraulically powered arm with a rock breaker attachment at a distal end thereof for reaching into the ROM bin to break any large rocks or clear blockages in the ROM bin.

Material from the ROM bin is fed to a vibratory 'grizzly' feeder 32. The feeder 32 receives the material and absorbs heavy shock loads from trucks, shovels and loaders unloading into the ROM bin.

A primary crusher 18A initially breaks the material down to smaller grade(s). The crushed material can be supplied to the conveyor 36 below the platform 16.1.

The conveyor can be provided as part of a conveyor module 38 that can be inserted under the platform for receiving the crushed material from the processing operation, and removal for servicing and/or transport.

The primary crusher machine 18A can include an impact crusher, gyratory crusher or jaw crusher. The secondary crusher machine 18B can include a cone crusher. The tertiary etc. crusher machine 18C . . . 18*n* can include a smaller capacity cone crusher machine than the secondary crusher machine. The platform 16.1 supports the drive means 19A, 19B for the respective crusher machines, such as at least one electric motor 19A for driving the primary crusher machine and at least one electric motor 19B for driving the secondary crusher machine.

Crushed material from one of the crusher machines can be supplied via the conveyor 36 to a screening module 14.

One or more retaining walls 40 can be provided, such as for retaining earth. One or more such retaining wall 40 may be pivotably attached to the structure of the crusher module (such as to a support 22.1, 22.2 (e.g. leg). The respective retaining wall may be removably attached for transport separate from the module. One or more braces 42 can be provided to support the respective retaining wall 40.

The platform can also support lubrication and heat exchange equipment for the cone crusher machine.

Drive for the vibratory grizzly feeder 32 can be provided by at least one drive means 46, such as one or more electric motors.

Access stairs 44 can be provided for access to the platform 16.1 from the ground/base. Additional access stairs 44 can be provided for access to one or more further elevated walkway levels/platforms 17, which may include railing 48.

A transportable material processing plant 10 can include a screening module 14 including a platform 16.2 supported on a number of supports 22.2. The supports, such as legs, can be attachable/removable, such as by bolting.

It will be appreciated that the respective platform 16.1, 16.2 can be transported to site, and erected on the supports 22.2, 22.2. The supports 22.2 can be attached by fasteners 23 such as bolts.

A surge bin 50 receives material for screening. The material is provided from the surge bin 50 to at least one conveyor 52, preferably two conveyors 52.1, 52.2 conveying a respective portion of the material in opposite directions. The material is conveyed to at least one screen or classifier 54.1, 54.2 e.g. via a respective head gauge 56.1, 56.2.

The screen/classifier 54.1, 54.2 grades the material into different comminuted sizes e.g. material as received from the crusher machine module or other process or supply.

The material can be graded by the screen/classifier into any two or more of oversize (large rocks), middlings (medium rocks) and undersize (small rocks).

A lower conveyor arrangement 58 conveys the undersize classification material to an outlet 60. Oversize classification and middling classification materials can be output at respective oversize classification discharge 62 and middlings classification discharge outlets 64.

The respective module (crushing or screening module) can include an on-board power system and/or an on-board control system, such as at an on-board MCC (motor control centre) 66 to control electric motors for the module (e.g. for the conveyors and for screen agitation).

It is to be understood that, if any prior art is referred to herein, such reference does not constitute an admission that the prior art forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A transportable bulk material processing plant comprising:

a transportable crusher module comprising:

a first container that is configured to receive a material;

a crusher system that is configured to crush the material to produce crushed material;

a first transportable platform that is configured to support the first container and the crusher system; and a plurality of supports, each support being configured to:

removably connect to the first transportable platform after the first transportable platform is transported to first operating location; and support the first transportable platform on a first base at the first operating location; and a transportable screening module comprising:

a second container that is configured to receive the crushed material from the crusher system of the transportable crusher module;

a first screening conveyor, at least part of the first screening conveyor being disposed below an outlet portion of the second container, the first screening conveyor being configured to convey crushed material received from the outlet portion of the second container in a first direction;

a second screening conveyor, at least part of the second screening conveyor being disposed below the outlet portion of the second container, the second screening conveyor being configured to convey crushed material received from the outlet portion of the second container in a second direction, the second direction being different to the first direction;

a first classifier that is configured to receive the crushed material from the first screening conveyor and to separate the crushed material into a first plurality of groups; and a second classifier that is configured to receive the crushed material from the second screening conveyor and to separate the crushed material into a second plurality of groups.

2. The transportable bulk material processing plant of claim 1, wherein the plurality of supports includes a number of legs.

3. The transportable bulk material processing plant of claim 1, wherein:

the crusher system comprises a rock breaker comprising a hydraulically powered arm; and a hydraulic supply that is associated with the rock breaker, the hydraulic supply being configured to enable control of the hydraulically powered arm;

wherein the hydraulically powered arm is configured to be controlled to break large rocks in the first container.

4. The transportable bulk material processing plant of claim 1, further comprising a vibratory feeder that is configured to receive the material from the first container.

5. The transportable bulk material processing plant of claim 4, wherein the crusher system comprises a primary crusher that is configured to receive the material from the vibratory feeder and to crush the material.

6. The transportable bulk material processing plant of claim 5, wherein the crusher system comprises a secondary crusher that is configured to receive material from the primary crusher and to crush the material.

7. The transportable bulk material processing plant of claim 6, wherein one or more of the primary crusher and secondary crusher comprises a jaw crusher, a cone crusher and a gyratory crusher, or a combination of any two or more thereof.

8. The transportable bulk material processing plant of claim 1, further comprising a conveyor module.

9. The transportable bulk material processing plant of claim 8, wherein at least a portion of the conveyor module is, in use, provided below the crusher system.

10. The transportable bulk material processing plant of claim 9, wherein the conveyor module is a discrete module arranged and configured to be moved under the first transportable platform supporting the crusher system and to be removed from under the first transportable platform, as required.

11. The transportable bulk material processing plant of claim 1, wherein the transportable crusher module and/or the transportable screening module is/are transportable on a marine vessel, road or rail vehicle.

12. The transportable bulk material processing plant of claim 1, further comprising at least one on-board control system and/or at least one on-board power system.

* * * * *